TELEGRAPH HUB CIRCUIT REPEATER

Filed Sept. 30, 1948 2 Sheets-Sheet 1

INVENTOR
W. T. REA
BY John E. Cassidy
ATTORNEY

Jan. 30, 1951 W. T. REA 2,539,551

TELEGRAPH HUB CIRCUIT REPEATER

Filed Sept. 30, 1948 2 Sheets-Sheet 2

INVENTOR
W. T. REA

BY

John E. Cassidy

ATTORNEY

Patented Jan. 30, 1951 2,539,551

UNITED STATES PATENT OFFICE 2,539,551

TELEGRAPH HUB CIRCUIT REPEATER

Wilton T. Rea, Manhasset, N. Y., assignor to Bell Telephone Laboratories, Incorporated, New York, N. Y., a corporation of New York Application September 30, 1948, Serial No. 52,071

7 Claims. (Cl. 178—73)

This invention relates to hub telegraph repeaters and more particularly to less expensive hub telegraph repeaters which may serve either with or without a multiway regenerator.

An object of the invention is the improvement of hub-type telegraph repeaters. Hub telegraph repeaters are well known in the art. Such repeaters of a type which are not arranged for multiway regeneration are described for instance in Patent 2,056,277 issued to F. S. Kinkead et al. October 3, 1936, and in Patent 2,069,224 issued to G. C. Cummings February 2, 1937. Hub repeaters arranged for multiway regeneration are described in Patents 2,337,496 and 2,392,339 issued to W. T. Rea on December 21, 1943, and January 3, 1946, respectively. The hub-type repeaters of the present invention have the advantage that they are simpler and less expensive than previously known hub-type repeaters which are arranged for multiway regeneration. Further they have the advantage, because of the relatively few and inexpensive elements employed in the control circuit, that they can be employed for operation either with or without multiway regeneration at different times. By this is meant that the control circuit of the present invention provided for use when a regenerative repeater is required is so inexpensive that the circuit is adapted to serve also when a regenerative repeater is not required. Formerly so many expensive elements were required in the control circuit when a regenerative repeater was employed with a hub circuit that this was not feasible.

The repeaters of the present invention have the further advantage that when used without multiway regeneration no control relay is required. In one embodiment of the invention no control relay is required for either service. In another embodiment of the invention a single control relay is required for multiway regeneration only.

A feature of the invention is a control circuit in a multiway regenerator hub-type telegraph repeater which requires no relay or other switching element.

Figure 1:
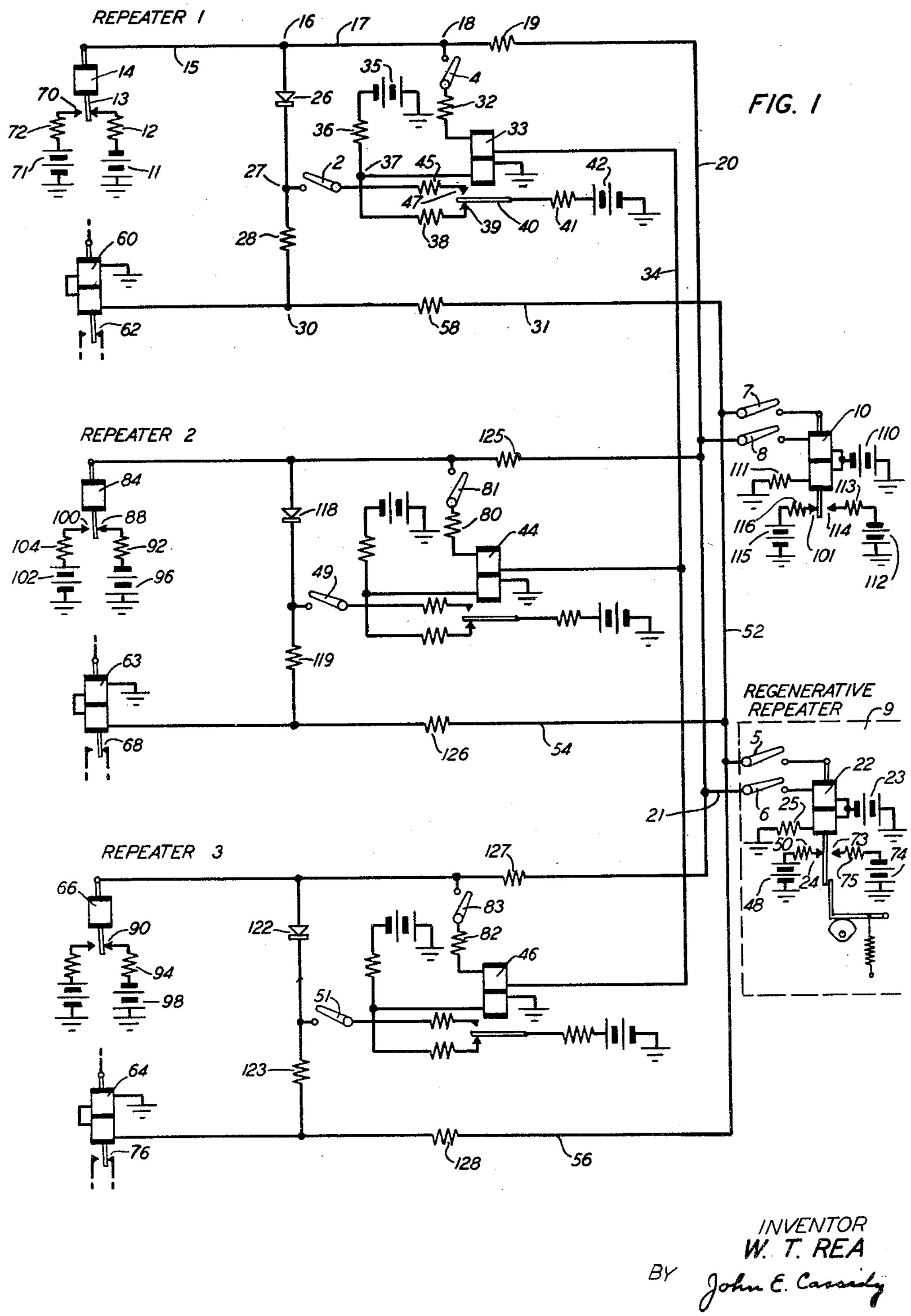
Figure 2:
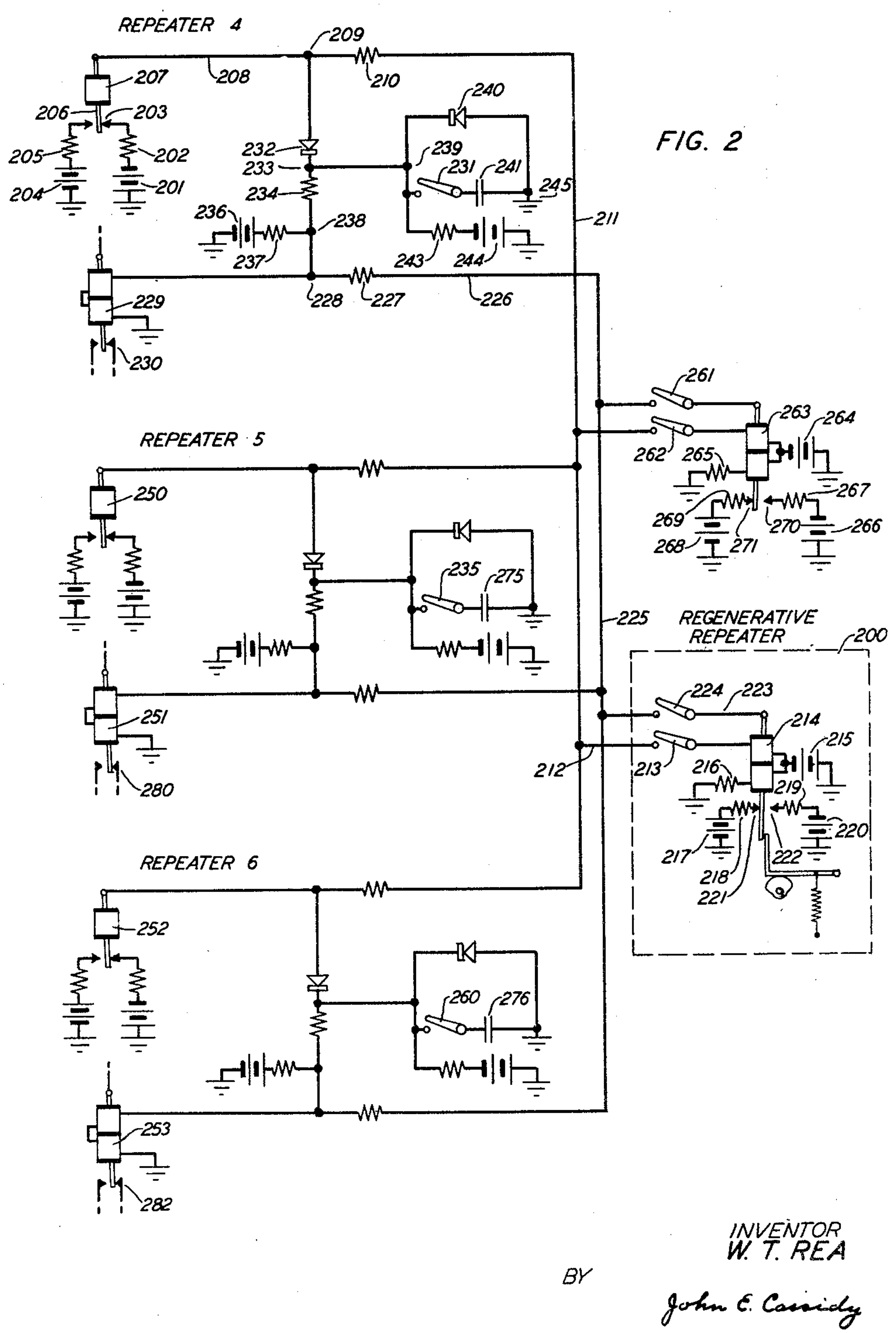

The invention may be understood from the following description when read with reference to the associated drawings in which:

Fig. 1 shows an embodiment of the invention in which a control relay is required for multiway regeneration; and Fig. 2 shows a second embodiment of the invention in which no control relay is required at any time.

Although the invention is presently incorporated in the two embodiments shown, it is to be understood that it is not so limited and it may take other forms which will be readily suggested to those skilled in the art by the following description and the associated drawings.

Refer now to Fig. 1.

*Embodiment per Fig. 1*

The manner in which the circuit per Fig. 1 functions when arranged for multiway regeneration will first be described.

The system shown in Fig. 1 comprises three individual repeaters indicated repeater 1, repeater 2, and repeater 3, the individual upper horizontal receiving branch and lower horizontal sending branch of each of which repeaters are interconnected through the common vertical receiving hub and the common vertical sending hub to one of the individual repeating devices shown at the right of Fig. 1. When multiway regeneration is not required the repeating relay 10 is employed and the regenerative repeating device 9 is not employed. For multiway regeneration the regenerative repeating device 9 is employed and the repeating relay 10 is not employed. The apparatus included between the sending and receiving leg in each of the individual repeaters is a control circuit which is primarily intended to prevent retransmission of signals received from any individual repeater back through the sending leg of the same repeater. The control circuit may be arranged by means of switches to function in two different manners for the two conditions. For multiway regeneration switches 2 and 4 in repeater 1, and corresponding switches in repeaters 2 and 3, will be closed. Switches 5 and 6 which connect the regenerative repeater 9 to the concentration of individual repeaters will also be closed. Switches 7 and 8 will be open.

Assuming switches 2, 4, 49, 81, 51, 83, 5 and 6 in the closed position, the circuit as shown in Fig. 1 is in the idle condition. The idle condition is the same as the marking condition except for the fact that during the first portion of a marking signal element which follows a spacing signal element the armature of the regenerative device 22 will be in engagement with its spacing contact 73 and will not be actuated to engage its marking contact 24 as shown in Fig. 1, until after the regenerative delay interval has elapsed. For the condition shown a path may be traced from negative battery 11 through resistance 12, armature 13 of receiving relay 14, and conductor 15 to parallel branches at junction 16. The receiving branch extends through conductor 17 to parallel branches at junction 18. The receiving branch continues through resistance 19 to the vertical receiving hub 20 and extends through conductor 21, switch 6, the top winding of relay 22 and negative battery 23 to ground. A corresponding path may be traced through the receiving branch in each of repeaters 2 and 3 and through the hub 20 and the top winding of relay 22 to grounded negative battery 23. Although but three repeaters are shown it is to be understood that ordinarily more than three individual repeaters may be connected to the hub. Attention is called to the fact that in each repeater negative battery, such as battery 11, is connected to the marking contact of the receiving relay and negative battery 23 is connected to the top winding of relay 22. The magnitude of the potential of all of these batteries is the same, so that no current flows in any of the receiving branches or through the top winding of relay 22 for this condition. The armature of relay 22 is maintained in engagement with its marking contact 24 under the influence of its biasing circuit which extends from negative battery 23 through the bottom winding of relay 22 and resistance 25 to ground. From junction 16 a circuit branch extends through dry rectifier 26 to junction 27 from which point the circuit extends through resistance 28 to junction 30 in the sending leg 31. From junction 27 a branch extends through switch 2 and resistance 45 to open contact 47 of relay 33. From junction 18 a circuit branch may be traced through switch 4, resistance 32 and the top winding of relay 33 to common conductor 34. A corresponding branch may be traced in each of repeaters 2 and 3 to common conductor 34. A circuit may be traced from negative battery 35 through resistance 36, junction 37, resistance 38, contact 39, armature 40 of relay 33, resistance 41, and positive battery 42 to ground. From junction 37 a branch extends through the bottom winding of relay 33 to ground. No current can flow through the top winding of relay 33 or the top winding of the corresponding relays 44 and 46 in each of the other repeaters for this condition, since negative batteries of the same magnitude are connected to each of the branches of the circuit which extends through each top winding. The magnitudes of the resistances 36, 38 and 41, and of batteries 35 and 42, are so chosen that a positive potential is applied through the bottom winding of relay 33 between junction 37 and ground and the effect of the current flowing through the bottom winding is such as to maintain the armature 40 of relay 33 in engagement with contact 39. Corresponding conditions prevail in relays 44 and 46 in repeaters 2 and 3.

When the armature of relay 22 in regenerative repeater 9 is in engagement with its marking contact 24, a circuit may be traced from positive battery 48 through resistance 50, contact 24, armature of relay 22, and switch 5 to the common vertical transmitting hub 52 which is joined in parallel to sending legs 31, 54 and 56. Sending leg 31 extends through resistance 58, junction 30 and the winding of sending relay 60 to ground. Sending legs 54 and 56 extend through corresponding paths in repeaters 2 and 3 respectively. The effect of the current flowing from positive battery 48 through the winding of sending relay 60 maintains the armature of relay 60 in engagement with its marking contact 62. The sending relays 64 and 66 are similarly controlled so that their armatures are in engagement with their marking contacts 68 and 76, respectively, for this condition.

Attention is called to the fact that dry rectifier 26 is so poled that the current from negative battery 11 cannot pass through the rectifier. Further since contact 47 is open, the sending relay 60 is under control solely of the positive battery 48 furnished from the regenerative repeater. The same is true of sending relays 63 and 64.

It will be assumed that repeater 1 now starts to transmit toward the hub. In response to the first spacing signal impressed on relay 14, its armature 13 will be actuated to engage with its spacing contact 70. Positive battery 71 will therefore be impressed through resistance 72 and contact 70 on the receiving branch of the repeater 1 and through the top winding of relay 22 in the regenerative repeater. Positive battery 71 will therefore be connected in series with negative battery 23. In response to this the armature of relay 22 will be actuated to engage with its spacing contact 73 and negative battery 74 will be impressed through resistance 75, contact 73 and the armature of relay 22 through switch 5 to sending hub 52, which connects in parallel through the windings of sending relays 60, 63 and 64. In the case of relays 63 and 64 the armatures of these relays will be actuated to engage with their spacing contacts to transmit the spacing signal over their respective sending lines to the distant stations. In the case of repeater 1 it is necessary that the spacing signal should not be transmitted by relay 60, since this would result in the retransmission of a signal received from the same repeater, repeater 1.

The manner in which the spacing signal is prevented from being retransmitted by relay 60 will now be explained.

When, in response to the received spacing signal in repeater 1, positive battery 71 is impressed on junction 16, current passes through dry rectifier 26, resistance 28 and the winding of relay 60 to ground. The effect of this current maintains the armature of relay 60 in engagement with its marking contact. As is well known in the art, the regenerative repeater 9 introduces a delay before it retransmits a signal impressed thereon. This is necessary in order that the middle or best portion of each received signal element may be sensed by the regenerative repeater to determine the nature of the signal element which is retransmitted. Relay 60 is placed under the influence of spacing battery 71 before the regenerated spacing signal from negative battery 74 is impressed on sending leg 31. The magnitudes of resistances 28 and 58 are so chosen that when positive battery 71 and negative battery 74 are applied through their respective branches on junction 30, a positive potential is impressed between junction 30 and ground through the winding of the sending relay 60. Therefore the spacing signal transmitted from battery 74, when it arrives in sending leg 31, is ineffective to operate sending relay 60 to spacing.

Attention was called heretofore to the fact that while the marking condition prevailed no current flowed through the top windings of control relays 33, 44 and 46 and the armature of each of these relays was maintained in engagement with its lower contact under the influence of current flowing through its bottom winding in each instance. When a receiving relay, such as relay 14, is actuated so that its armature engages its spacing contact, such as 70, positive battery is impressed on junction 18 and current flows through the top winding of relay 33, conductor 34 and in parallel through the top windings of relays 44 and 46, through resistances 80 and 82, switches 81 and 83, armatures of receiving relays 84 and 66, marking contacts 88 and 90 and resistances 92 and 94 to negative batteries 96 and 98, respectively. The effect of this current flowing through the top winding of relay 33 actuates its armature 40 to engage with its contact 47. When armature 40 breaks from contact 39, the direction of the flow of current through the bottom winding of relay 33 is reversed and its effect is such as to augment the effect of the current in the upper winding of relay 33, so that the armature 40 is maintained securely in engagement with contact 47. When armature 40 engages with contact 47 positive battery 42 is impressed through resistance 41, armature 40, contact 47, resistance 45 and switch 2 on junction 27, so that positive battery 71 and positive battery 42 are connected in parallel through resistance 28 and the winding of sending relay 60.

When relay 14 is again actuated to engage with its marking contact, dry rectifier 26 prevents the passage of current from negative battery 11. However, positive battery 42 remains effective to maintain sending relay 60 on its marking contact.

When in response to succeeding marking signals, negative battery 11 is impressed on junction 18, the flow of current through the top winding of relay 33 ceases. However, the armature 40 of relay 33 is maintained in engagement with its contact 47 by the effect of current flowing through the bottom winding of relay 33. So as long as transmission continues from relay 14 in repeater 1, towards the regenerative repeater, the armature 40 of relay 33 will remain in engagement with its contact 47 and the sending relay 60 in repeater 1 will be maintained in engagement with its marking contact.

If relay 14 ceases to transmit toward the regenerative repeater, relay 33 will remain locked with its armature 40 in engagement with its contact 47 to continue to maintain the armature of sending relay 60 on marking.

If the receiving relay, such as relay 84, in another repeater, such as repeater 2, starts to transmit toward the regenerative repeater, it is necessary to unlock relay 33, that is assuming that repeater 1 was the last to transmit toward the regenerative repeater, in order that the first signal element received by relay 84 may be transmitted by the sending relays in each repeater, other than sending relay 63 in repeater 2, including sending relay 60 in repeater 1. The manner in which relay 33 is unlocked is as follows:

When the armature of relay 84 engages with its spacing contact 100, positive battery 102 is connected through resistance 104, contact 100, armature of relay 84, switch 81, resistance 80 and the top winding of relay 44 to vertical conductor 34 which connects to parallel branches. One branch extends through the top winding of relay 33, resistance 32 and switch 4 to negative battery 11, connected to the marking contact of relay 14. The other branch extends through a corresponding circuit in repeater 3. The effect of current flowing through the winding of relay 33 in this direction will actuate the armature 40 to engage with contact 39. This removes the lock from relay 60 before the first regenerated signal is received from the regenerative repeater.

With respect to the effect of current flowing through the top winding of relay 46 in the circuit last traced it will be in a direction to maintain the armature of relay 46 more securely in engagement with its lower contact so that the sending leg of repeater 3 will remain unlocked. With respect to relay 44 in repeater 2, it will function in the same manner as described for relay 33 in repeater 1 when relay 14 started to transmit toward the regenerative repeater, placing a locked marking condition on relay 63 so as to prevent the retransmission of signals, now assumed incoming through relay 84 in repeater 2, back through sending relay 63 in the same repeater.

When a regenerator is not required in the embodiment per Fig. 1 switches 5 and 6 are open. Switches 7 and 8 are closed. Switches 2 and 4 are opened to disconnect a portion of the control circuit in repeater 1. Switches 49 and 81, 51 and 83 corresponding to switches 2 and 4, respectively, in each of repeaters 2 and 3 are also opened.

For the marking condition the armature of polar telegraph relay 10 will be actuated to engage with its marking contact 101 under the influence of current flowing from negative battery 110 through the lower winding of relay 10 and resistance 111 to ground. No current will flow through the receiving branch of any of repeaters 1, 2 or 3 or through the top winding of relay 10 since battery of the same polarity and magnitude is connected to the marking contact of relays 14, 84 and 66 and to the top winding of relay 10. Sending relays 60, 63 and 64 will be maintained in their marking condition by the effect of current flowing from positive marking battery 115 through resistance 116, contact 101, armature of relay 10 and switch 7, which connects to sending hub 52 from whence the sending legs 31, 54 and 56 in each of repeaters 1, 2 and 3, respectively, extend through resistances 58, 126 and 128 and the windings of sending relays 60, 63 and 64, respectively, to ground.

No current flows in any individual repeater through the branch corresponding to that between junctions 16 and 30 in repeater 1 for the marking condition, for as explained heretofore the dry rectifier such as rectifier 26 in repeater 1 does not pass current when its upper terminal is negative with respect to its lower terminal.

It will again be assumed that relay 14 in repeater 1 starts to transmit. When the armature 13 of relay 14 is actuated to engage its spacing contact 70 positive battery 71 is connected through the receiving branch of repeater 1, hub 20, switch 8 and the top winding of relay 10 to negative battery, actuating the armature of relay 10 to engage with its right-hand or spacing contact. As a result of this negative battery 112 is impressed through resistance 113, contact 114, armature of relay 10, switch 7, sending hub 52, through the sending legs, on the windings of the sending relays 60, 63 and 64. Relays 63 and 64 respond to repeat the spacing signal over their respective connected lines. However, relay 60 is prevented from responding by current which flows from positive battery 71 through the branch between junctions 16 and 30 and through the winding of relay 60 to ground, which maintains relay 60 in the marking condition, the junction 30 as heretofore explained being maintained positive for this condition by a proper choice of resistance and potential values.

Attention is called to the fact that when a regenerative repeater is not required no appreciable delay is introduced by the repeating device 10. On a transition from spacing to marking of the armature 13 of relay 14 for instance the armature of relay 10 is actuated almost instantly from its spacing to its marking contact under the influence of its biasing winding which becomes effective the instant armature 13 separates from its spacing contact 70 and during its transition to its marking contact. The interval during which negative spacing battery 112 remains applied through sending branch 31 to the winding of relay 60 after armature 13 leaves its spacing contact 70 is therefore negligibly short, too short for the false operation of relay 60 to spacing. For this reason a single dry rectifier and a resistance in the branch between the junctions 16 and 30 are all that are needed to effect the control function when regeneration is not required.

The reason a control circuit containing additional elements is required in the embodiment per Fig. 1 for regenerative service is because of the delay, mentioned above, introduced by the regenerative repeater. There is an interval, equal to approximately one-half the duration of a spacing signal element, during which negative spacing potential 74 is required to be applied by the regenerative repeater 9 for the completion of transmission of a spacing signal element. If for instance relay 14 is receiving and the reception of a spacing signal has just been completed, the armature 13 will be actuated to its marking contact in response to the first portion of the following marking signal element. The regenerator will continue to transmit a negative spacing signal element for the delay interval. This would be unopposed since the negative marking battery from relay 14 would be ineffective. This accounts for the necessity for the additional features described in the foregoing for multiway regenerator operation in the embodiment per Fig. 1.

*Embodiment per Fig. 2*

Refer now to Fig. 2. Fig. 2, like Fig. 1, may be arranged for use with or without multiway regeneration. In either case no electromagnet or other type relay or switching element is required in the control circuit individual to each repeater.

Fig. 2 is in certain respects similar to Fig. 1. It shows three individual repeaters numbered repeaters 4, 5 and 6 connected through a sending and receiving hub which hubs may be connected by means of switches either to a regenerative repeater 200 or to a polar telegraph relay repeater 263. When the system is to be arranged for multiway regeneration switches 213 and 224 are closed to connect the regenerative repeater and switches 261 and 262 are opened. Switches 231, 235 and 260 in repeaters 4, 5 and 6, respectively, are closed so as to connect capacitances 241, 275 and 276 in circuit. These capacitances are not required except for multiway regeneration operation. Although but three individual repeaters, repeaters 4, 5 and 6, are shown, it is to be understood that ordinarily a larger number will be employed.

When the designated switches are closed the system of Fig. 2 is in the idle condition which, as heretofore explained for Fig. 1, is the same as for marking except that, when a marking signal element follows a spacing signal element, because of the delay introduced by the regenerative repeater 200, the regenerating device 214 will be delayed for the duration of half a signal element before it assumes its marking position as shown. As a result of this in cases wherein a marking signal element follows a spacing signal element the armature of relay 214 will remain in engagement with its spacing contact 222 for the first portion of the signal element and will not engage its marking contact 221 until after this period has elapsed. For the idle and marking condition the armatures of each of relays 207, 250 and 252 will be in engagement with their right-hand or marking contacts as shown. This will connect negative battery from each, such as negative battery 201, in repeater 4, through resistance 202, marking contact 203, conductor 208 and resistance 210 to the vertical receiving hub 211 which interconnects all of the receiving branches. From hub 211 the circuit extends through conductor 212, switch 213 and the top winding of relay 214 in regenerative repeater 200 to negative battery 215. Thus negative battery in each receiving branch is connected in parallel through the top winding of relay 214 to negative battery and no current flows in any branch or through the top winding of relay 214. The armature of relay 214 is maintained in engagement with its marking contact 221 under the influence of current flowing from negative battery 215 through the bottom winding of relay 214 and resistance 216 to ground.

A circuit may also be traced from positive marking battery 217 through resistance 218, marking contact 221, armature of relay 214, conductor 223 and switch 224 to vertical sending hub 225 which is connected to the three sending branches in the three repeaters in parallel. The branch in repeater 4 extends through conductor 226, resistance 227 and the winding of sending relay 229 to ground. A corresponding sending branch may be traced in each of repeaters 5 and 6. The effect of the current in each of the sending branches maintains the armature of the sending relay in each repeater, such as relay 229 in repeater 4, in engagement with its marking contact, such as contact 230.

Each of repeaters 4, 5 and 6 has a similar control circuit. That in repeater 4 comprises a branch interconnecting junction 209 in the receiving leg to junction 228 in the sending leg and a condenser rectifier resistance timing circuit which connects to junction 233. The circuit may be traced from junction 209, through dry rectifier 232 and resistance 234 to junction 228. A branch of this circuit extends from grounded positive battery 236 through resistance 237 to junction 238. Another branch of this circuit extends from junction 233 to three parallel branches. The first of the three parallel branches extends through dry rectifier 240 to ground. A second branch extends through switch 231 and condenser 241 to ground. The third branch extends through resistance 243 and negative battery 244 to ground.

The dry rectifiers, such as rectifiers 232, do not pass current from negative battery so that when the armature of any receiving relay such as relay 207 is in the marking condition, as shown, the negative battery connected to its marking contact has no influence on the sending relay in the same repeater.

It will now be assumed that the armature of relay 207 is actuated to engage with the spacing contact. In response to this, positive battery 204 is connected through resistance 205 and the spacing contact and armature of relay 207. The effect of this current, after the usual regenerator delay interval, actuates the armature of relay 214 to its spacing contact 222. This connects negative battery 220 through resistance 219 and the spacing contact 222 and armature of relay 214. Relays 251 and 253 will follow this signal each being actuated to its respective spacing contact to transmit a spacing signal over the line connected thereto. It is important, for reasons which should be apparent from the foregoing, that relay 229 should not respond to this signal and that its armature should remain in engagement with its marking contact throughout the interval while repeater 4 is transmitting toward the hub. How this is achieved will now be explained.

As in the embodiment per Fig. 1, when positive battery is applied to the top terminal of the dry rectifier in a control circuit, such as dry rectifier 232, current flows freely through it and through resistance 234, junction 228 and the winding of sending relay 229. The polarity of junction 228 becomes positive almost instantly and, due to a choice of resistance values, the positive polarity is maintained even after the armature of relay 214 engages its spacing contact 222 and negative battery 220 is impressed on the sending leg. During the spacing interval of relay 207 the left-hand plate of condenser 241 is charged positively substantially to the potential of battery 204. After the end of the spacing signal interval of relay 207, the armature 206 will again be actuated to engage its marking contact 203. The armature of relay 214 in regenerative repeater 200 will remain in engagement with its spacing contact 222 during the delay interval. It is necessary to maintain the armature of relay 229 on its marking contact during this delay interval. This is performed by the discharge of condenser 241 through the winding of relay 229. Dry rectifier 240 is so poled that it does not pass current from positive battery 204, permitting the left-hand plate of condenser 241 to build up, as mentioned, substantially to the positive potential of battery 204. Once the positive potential source 204 is disconnected condenser 241 starts to discharge through two parallel paths comprising resistance 243 to negative battery 244 and reristance 234, winding of relay 229 to ground. The current voltage discharge characteristic curve of a condenser when discharging from say a positive voltage to ground, as is well known, has an inclined substantially straight line portion during which the current decreases at a substantially constant rate as the voltage decreases and then the curve flattens while the current falls more slowly as the voltage decreases. When a condenser which is charged to a certain level by a potential of one polarity discharges to a potential of the opposite polarity the current voltage curve does not flatten but remains at a substantially constant pitch as the potential of he condenser approaches ground potential. The ground 245 acts, through rectifier 240, as a limiter. When the left-hand terminal of condenser 241 reaches ground potential the discharge of the condenser ceases. The capacitance of the condenser and the magnitude of the resistances and potentials are so chosen that relay 229 is maintained on its marking contact during a fixed predetermined delay interval on a transition from spacing to marking and until the effect of positive battery 217 applied to the marking contact of relay 214 in the regenerative repeater becomes effective to maintain the armature of relay 229 in the marking condition.

The function of positive battery 236 connected through resistance 237 to junction 238 is to compensate for the biasing effect of battery 244 on relay 229. During the actuation of relay 229 by signals originating at relay 250 or relay 252, a marking current is supplied to junction 228 by battery 236 through resistance 237 which is equal in magnitude to the spacing current which is supplied to junction 228 by battery 244 through resistances 243 and 234. Consequently, relay 229 is permitted to faithfully reproduce the signals impressed on it by regenerative repeater 200.

When a regenerator is not required in the embodiment per Fig. 2, switches 213 and 224 are opened. Switches 261 and 262 are closed. Switches 231, 235 and 260 are opened in each of the individual repeaters.

Under this condition relay 263 functions in a manner corresponding to that of relay 10 in Fig. 1. In response to signals incoming through the receiving relay such as relay 207 in any individual repeater such as repeater 4, relay 263 will impress the signals on the sending relays such as 251 and 253 in the individual repeaters which will follow and retransmit the signals. There will be no appreciable delay. The sending relay such as relay 229 must not follow the signals received from its own repeater, and will be maintained in the marking condition by positive battery 268 during marking intervals.

During spacing intervals the effect of positive battery such as battery 204 through the control branch between terminals 209 and 228 will be dominant over negative battery 266 on the spacing contact of relay 263 to maintain the armature of relay 229 in the marking condition.

It will be understood, however, that optionally switches 231, 235 and 260 may be left closed when a regenerator is not used. In this case the holding effect of condensers 241, 275 and 276 will serve to insure that the sending relay of a repeater which is receiving signals from the line will be maintained in the marking condition, even if relay 263 should be slow in returning from the spacing to the marking condition.

What is claimed is:

1. In a telegraph system, an individual hub-type repeater, a receiving relay connected to a receiving leg, a sending relay connected to a sending leg and a control circuit interconnecting said legs, for preventing retransmission by said sending relay of signals received through said receiving relay, sources of potential of opposed polarities connectable to the armature of said receiving relay for the transmission of marking and spacing signal elements, said control circuit consisting of a potential polarity sensitive shunt interconnecting said legs to control said sending relay during the transmission of one or the other of said marking or said spacing signal elements.

2. In a telegraph system, an individual hub-type repeater, a receiving relay connected to a receiving leg, a sending relay connected to a sending leg, a control circuit interconnecting said legs for preventing retransmission by said sending relay of signals received by said receiving leg, said control circuit having a potential polarity sensitive shunt and a condenser discharge delay circuit connectable to said shunt to prolong the interval of control of said sending relay when required.

3. In a telegraph system, an individual hub-type repeater having a receiving relay connected through an individual receiving leg and a common receiving hub and a sending relay connected through an individual sending leg and a common sending hub, each of said hubs flexibly connectable to a relay repeater at a first time and to a regenerative repeater at a second time, a control circuit directly interconnecting said legs, to prevent retransmission by said sending relay of signals received by said receiving relay, a group of control elements, and flexible switching means in said control circuit for adding said elements to or subtracting said elements from said control circuit to arrange said hub-type repeater for effective operation at said first and said second times.

4. In a telegraph system, at least two individual repeaters, a single repeater common to said individual repeaters, a receiving leg and a transmitting leg in each of said individual repeaters interconnected to said single repeater through a common receiving hub and a common transmitting hub, means in each one of said individual repeaters for effectively transmitting from any one of said individual repeaters at a particular time through said receiving hub said single repeater and said transmitting hub to all of the other of said individual repeaters simultaneously, an individual potential polarity sensitive shunt control circuit connected directly between said receiving leg and said sending leg in each of said individual repeaters for preventing retransmission of signals originating in any one of said individual repeaters back through the same individual repeater in which the signals are originating.

5. A system in accordance with claim 4, said system including additional elements in said control circuit to prevent said retransmission when said single repeater is a regenerative repeater.

6. A system in accordance with claim 4, said system including additional elements in each of said control circuits to prevent said retransmission when said single repeater is a regenerative repeater, said elements including not more than one relay individual to each of said control circuits, a winding on each of said relays, said winding connected individually to its associated receiving leg, and a common connection connecting each of said windings in parallel.

7. In a telegraph system, at least two individual repeaters, a single repeater common to said individual repeaters, a receiving leg and a transmitting leg in each of said individual repeaters interconnected to said single repeater through a common receiving hub and a common transmitting hub, means in each one of said individual repeaters for effectively transmitting from any one of said individual repeaters at a particular time through said receiving hub said single repeater and said transmitting hub to all of the other of said individual repeaters simultaneously, an individual potential polarity sensitive shunt control circuit connected directly between said receiving leg and said sending leg in each of said individual repeaters for preventing retransmission of signals originating in any one of said individual repeaters back through the same individual repeater in which the signals are originating, said system including additional elements in said control circuit to prevent said retransmission when said single repeater is a regenerative repeater, said additional elements consisting of a condenser, a potential polarity sensitive element, resistors and sources of potential.

WILTON T. REA.

REFERENCES CITED

The following references are of record in the file of this patent:

UNITED STATES PATENTS

| Number | Name | Date |
|---|---|---|
| 2,334,551 | Hanley | Nov. 16, 1943 |